United States Patent [19]

Yamanoi et al.

[11] Patent Number: 5,714,271
[45] Date of Patent: Feb. 3, 1998

[54] ELECTROLYTIC CONDENSER ELECTRODE AND ALUMINUM FOIL THEREFOR

[75] Inventors: Tomoaki Yamanoi; Tadao Fujihira; Ichizo Tsukuda, all of Osaka; Eizo Isoyama, Nara; Shigeru Endo, Osaka, all of Japan

[73] Assignee: Showa Aluminum Corporation, Sakaishi, Japan

[21] Appl. No.: 365,453

[22] Filed: Dec. 28, 1994

[30] Foreign Application Priority Data

Dec. 29, 1993 [JP] Japan ..................... 5-355010
May 13, 1994 [JP] Japan ..................... 6-100161

[51] Int. Cl.$^6$ ..................... C22C 21/06; H01G 9/045; H01G 9/055
[52] U.S. Cl. ..................... 428/606; 428/687; 420/542; 361/305
[58] Field of Search ..................... 428/606, 687; 420/542, 528; 361/305

[56] References Cited

U.S. PATENT DOCUMENTS

| | | | |
|---|---|---|---|
| 3,498,765 | 3/1970 | Hunter | 29/183 |
| 3,578,570 | 5/1971 | Kissin | 204/33 |
| 4,068,148 | 1/1978 | Badia | 420/528 |
| 4,164,434 | 8/1979 | Fister et al. | 428/687 |
| 4,166,755 | 9/1979 | Fister et al. | 428/687 |
| 4,214,041 | 7/1980 | Fister et al. | 428/607 |
| 4,751,086 | 6/1988 | Jeffrey et al. | 420/542 |
| 4,845,543 | 7/1989 | Okikawa et al. | 420/542 |
| 5,316,632 | 5/1994 | Remppel | 205/704 |

FOREIGN PATENT DOCUMENTS

| | | | |
|---|---|---|---|
| 458241 | 7/1949 | Canada | 420/542 |
| 529287 | 8/1956 | Canada | 420/528 |
| 0 173 366 | 3/1986 | European Pat. Off. . | |
| 358335 A1 | 3/1990 | European Pat. Off. . | |
| 59-56560 | 4/1984 | Japan | 420/528 |
| 5-43972 | 2/1993 | Japan . | |
| 596067 | 12/1947 | United Kingdom | 420/542 |

OTHER PUBLICATIONS

JP-A-4-062821—Patent Abstract of Japan—vol. 16, No. 267, (E-1217) Feb. 27, 1992—Abstract.

Database WPI—Derwent Publication, Ltd., Section Ch, Week 8940 & JP-A-01 212 427—Aug. 25, 1989—Abstract.

*Primary Examiner*—John J. Zimmerman
*Attorney, Agent, or Firm*—Armstrong, Westerman, Hattori, McLeland & Naughton

[57] ABSTRACT

A raw aluminum foil for use to prepare electrolytic condenser electrodes has an aluminum purity of 99.9% or higher and contains 50–500 ppm of Mg. A method of etching the raw foil to prepare the electrodes consists of a primary etching step and a secondary etching step, and the primary etching is conducted in an aqueous bath containing 3–10% by weight of HCl and 10–40% by weight of $H_2SO_4$, at 70°–90° C. and with a current density of 10–40 A/dm$^2$. The secondary etching is conducted electrolytically or chemically in a further bath containing 3–10% by weight of HCl, with or without 1% or less of $H_2C_2O_4$ added to the further bath, at a bath temperature of 70°–95° C. and with a current density of 0–10 A/dm$^2$.

4 Claims, No Drawings

ELECTROLYTIC CONDENSER ELECTRODE AND ALUMINUM FOIL THEREFOR

BACKGROUND OF THE INVENTION

1. Field of the Invention

The present invention relates to an aluminum electrode for constituting electrolytic condensers or capacitors, an aluminum foil as a raw material used to prepare the electrode and a method of etching the aluminum foil.

2. Description of the Prior Art

In general, aluminum foils used as the raw material of electrolytic condensers are and have been generally subjected to the electrochemical or chemical etching treatment. The purpose of this treatment is to increase the effective surface area and to thereby increase the electrostatic capacity of each foil.

Such a simple etching is insufficient to enhance the required electrostatic capacity to the foils. Therefore, a high temperature heat treatment has widely been carried out at a temperature of 450° C. or higher, during the final annealing process after the foil rolling process. The heat treatment provides a 'cluster texture' rich in 'cubic azimuth' that improves the etching property of raw foils to a noticeable degree. However, this method has also proved insufficient to meet the recent demand for much higher capacitance of electrolytic capacitors.

SUMMARY OF THE INVENTION

Thus, an object of the present invention is to provide an aluminum foil that can be of a further increased electrostatic capacitance for use as the electrolytic condenser electrodes.

Another object of the invention is to provide an aluminum foil electrode that is of a further increased capacitance for use in the electrolytic condensers.

Still another object is to provide a method of etching the aluminum foil to produce the electrolytic condenser electrodes having the further increased capacitance.

The present inventors have carried out a series of researches and studies to find that a small quantity of Mg (viz., magnesium) had better be added to a raw aluminum foil. The added amount of Mg was effective to increase the density of etching pits, not reducing the number of 'cubic azimuth' in but improving capacitance of the electrode foil.

According to the present invention established based on such a knowledge, an aluminum foil comprising 99.9% by weight or more of aluminum and containing Mg of 50–500 ppm is provided. Also in accordance with the present invention, a method of etching this aluminum foil comprises a preceding primary etching step and a succeeding secondary etching step. The primary etching is to be conducted electrolytically in an aqueous solution composed of 3–10% by weight of HCl (viz. hydrogen chloride) and 10–40% by weight of $H_2SO_4$ (viz. sulfuric acid), at temperature of 70°–90° C. and with a current density of 10–40 A/dm². The secondary etching is to be conducted electrolytically or chemically in a further aqueous solution of 3–10% HCl, with or without 1% by weight of or less of $H_2C_2O_4$ (viz. oxalic acid) at a temperature of 70°–95° C. and with a current density of 0–10 A/dm².

Other objects, features and advantages of the present invention will become apparent from the following details.

DETAILED DESCRIPTION OF THE INVENTION

The aluminum purity of the foil provided herein must be 99.9% or higher, because impurities contained in large quantities would hinder the etching pits from growing to a desired extent in a preferable manner during the etching process. Even the prescribed amount of Mg would be insufficient in such an event to ensure production of a number of uniform and deep tunnel-shaped etching pits, thus failing to realized a sufficiently high electrostatic capacitance. Therefore, a more preferable aluminum purity of the raw foil is 99.98% or higher.

Mg contained in aluminum foil is an element serving to evenly distribute the pits, during the etching process. In general, fine lugs and recesses, oils, roll-coated substances and any decomposition products thereof present on the foil surface will likely produce a number of uneven and locally dissolved pits, during the initial stage of said etching process. The density of etching pits will thus become uneven, too dense at a portion and too coarse at other portions. In an extreme case, some surface portions of the foil are dissolved deep to form 'craters'. This unevenness remains in the foil completely etched, and lowers the electrostatic capacitance thereof.

Many efforts have been made by many researchers to control the described causes and factors that might affect the etching process. Meanwhile, the present inventors recently came up to a novel knowledge that the addition of Mg and a noticeable segregation thereof at a surface layer are effective to diminish the unevenness in distribution of the etching pits. It is well known in the art that Mg element segregates in the surface layers of aluminum articles, when the latter are heated to extremely high temperatures. The present inventors have observed fine shallow grooves in a rolled surface layer of each aluminum article, if Mg has previously segregated in this layer. Those grooves, which extend in the crystallographic (100) plane along and perpendicular to the rolling direction, cause partial and local dissolution of said surface layer during the initial stage of etching process. Subsequently, the etching pits grow in a direction normal to the rolled surface and towards the interior of foil. Such a groove-shaped surface dissolution at the initial stage has proved effective to eliminate the fine lugs and recesses, the roll-coated impurities and the decomposition products thereof present in the surface layer of each raw foil.

In order to assure such an effect, Mg must be contained at a concentration of 50 ppm or more. However, a Mg concentration exceeding 500 ppm is superfluous and brings about an excessive segregation of MG during the final annealing step. The excessive segregation results in a violent dissolution of the surface layer of each foil, thereby reducing the thickness of finished foil to such an extraordinary extent that no effect of improving electrostatic capacitance is obtained. Thus, Mg content is preferably 50–500 ppm, and more preferably 50–100 ppm in the present invention.

An unetched raw foil may be prepared according to the known conventional method. For example, a predetermined amount of Mg will be added to an aluminum ingot when or before melting and casting it. A cast sheet will be hot rolled, cold rolled, and further rolled after subjected to an intermediate annealing step, if necessary, to produce a raw foil. This raw foil may then be subjected a final hot annealing step, also if so required.

The aluminum foil thus prepared will subsequently be etched to produce an electrode for use in electrolytic condensers. Although the conditions of the etching process are not limited to any particular or special ones, a preferable method is proposed herein.

The present method consists of two steps that are a primary etching and a secondary etching. The primary etching is conducted in an electrolytic aqueous solution containing hydrogen chloride (viz. HCl) and sulfuric acid (viz. $H_2SO_4$). The present inventors have found that $H_2SO_4$ concentration in the primary etching solution should fall within a certain range, in order to properly suppress the dissolution of foil surface and at the same time to render the etching pits distributed uniform over said surface. In a case wherein the concentration of $H_2SO_4$ in the aqueous solution is less than 10%, an excessive surface dissolution due to Mg causes a lower electrostatic capacitance of the finished foil. In another case wherein $H_2SO_4$ concentration in the aqueous solution is higher than 40%, an excessively high density of etching pits permits the neighboring pits to merge into a greater pit. Such large pits lower the electrostatic capacitance of the finished foil. Therefore, $H_2SO_4$ concentration in the primary etching solution is preferably 10–40%, and more preferably 20–35%. The other conditions of the primary etching may be selected so that a sufficient effective surface will be obtained after the final forming step. Desirable HCl concentration, bath temperature and direct-current density are: 3–10%, 70°–90° C. and 10–40 $A/dm^2$. These conditions will give a favorable density, diameter and length (or depth) of the etching pits.

The secondary etching is conducted to enlarge each of the pits that will have been produced by the primary etching. The bath for the secondary etching is basically a hydrogen chloride aqueous solution containing HCl at 3–10%. 1% or less of oxalic acid (viz. $H_2C_2O_4$) may be added to the HCl solution. Bath temperature will be set at 70° C. to 95° C., with a direct-current of not more than 10 $A/dm^2$ applied to the bath in case of an electrolytic etching, or without any current in case of a chemical etching. Any condition not included in the prescribed range will impair the effect of enlarging the etching pits.

Such a combination of the primary etching with the secondary etching produces aluminum foils of a higher electrostatic capacitance, as compared with those produced by the prior art methods.

THE PREFERRED EXAMPLES

Example 1

Aluminum blocks of chemical compositions shown in Table 1 were cast and then their rough surfaces were removed, to prepare snug blocks. Each of those snug blocks was then subjected to a hot rolling, a cold rolling (including the intermediate annealing) and a final annealing to produce raw aluminum foils. The intermediate and final annealing steps for the foil samples A to C were conducted at 250° C. for 6 hours, and at 500° C. for 10 hours, respectively. The intermediate and final annealing steps for the other foil samples D to J were conducted at 300° C. for 6 hours, and at 550° C. for 10 hours, respectively.

Percentage of the cubic azimuth was measured for each foil sample, to give a result shown in Table 1.

Subsequent to the preparation of raw foils, they were etched under the conditions listed below and then subjected to the forming process in a 5% boric acid solution with a current of 250 V. Their electrostatic capacitance were determined to give values which are expressed in %, taking the value for the sample C not containing Mg as 100%, in Table 1.

[Etching Conditions]

Pretreatment: none
Primary etching:

Bath composition: 5% HCl+10% $H_2SO_4$

Temperature: 80° C.

Current density: 20 $A/dm^2$

Duration: 80 seconds

Secondary etching:

Bath composition: 5% HCl

Temperature: 80° C.

Current density: 5 $A/dm^2$

Duration: 10 minutes

TABLE 1

| Samples | Composition (ppm) | | | | | | | | | | Ratio of cubic azimuth | Electrostatic capac.* |
|---|---|---|---|---|---|---|---|---|---|---|---|---|
| | Si | Fe | Cu | Mn | Zn | Ti | B | Pb | Mg | Al | | |
| Invention | | | | | | | | | | | | |
| 'A' | 10 | 10 | 30 | <1 | <1 | <1 | <1 | 1 | 60 | bal.** | 95% | 105% |
| Reference | | | | | | | | | | | | |
| 'B' | 10 | 10 | 30 | <1 | <1 | <1 | <1 | 1 | 30 | bal. | 97% | 99% |
| 'C' | 10 | 10 | 30 | <1 | <1 | <1 | <1 | 1 | <1 | bal. | 98% | 100% |
| Invention | | | | | | | | | | | | |
| 'D' | 35 | 25 | 30 | 5 | <1 | <1 | 5 | 1 | 60 | bal. | 92% | 103% |
| 'E' | 35 | 25 | 30 | 5 | <1 | <1 | 5 | 1 | 100 | bal.* | 90% | 105% |
| 'F' | 35 | 25 | 30 | 5 | <1 | <1 | 5 | 1 | 250 | bal. | 90% | 110% |
| 'G' | 35 | 25 | 30 | 5 | <1 | <1 | 5 | 1 | 450 | bal. | 89% | 104% |
| Reference | | | | | | | | | | | | |
| 'H' | 35 | 25 | 30 | 5 | <1 | <1 | 5 | 1 | 600 | bal. | 88% | 97% |
| 'I' | 35 | 25 | 30 | 5 | <1 | <1 | 5 | 1 | 30 | bal. | 93% | 97% |
| 'J' | 35 | 25 | 30 | 5 | <1 | <1 | 5 | 1 | <1 | bal. | 95% | 98% |

Notes:
*capac. = capacitance
**bal. = balance

The samples each containing the prescribed amount of Mg proved superior to the others each containing Mg at concentration not included in the prescribed range, in electrostatic capacitance.

Example 2

The sample foils 'A' and 'E' listed in Table 1 were subjected to the primary and secondary etching processes, under the conditions prescribed in Table 2. Electrostatic capacitance of each foil thus etched was then measured to give the data also expressed in terms of %, taking the value for the sample C in Table 1 as 100%.

TABLE 2

| Samples | Foil | 1st Etching | | | | 2nd Etching | | | | Electro. static |
|---|---|---|---|---|---|---|---|---|---|---|
| | | Bath | Temp | Cur. | t" | Bath | Temp | Cur. | t' | capac.* |
| Invention | | | | | | | | | | |
| '1' | 'A' | c | 80 | 20 | 80 | h | 85 | 10 | 5 | 106% |
| '2' | 'A' | d | 80 | 20 | 80 | h | 85 | 10 | 5 | 109% |
| '3' | 'A' | e | 80 | 20 | 80 | h | 85 | 10 | 5 | 111% |
| '4' | 'A' | f | 80 | 20 | 80 | h | 85 | 10 | 5 | 105% |
| Reference | | | | | | | | | | |
| '5' | 'A' | b | 80 | 20 | 80 | h | 85 | 10 | 5 | 101% |
| '6' | 'A' | g | 80 | 20 | 80 | h | 85 | 10 | 5 | 102% |
| Invention | | | | | | | | | | |
| '7' | 'E' | e | 86 | 20 | 80 | h | 85 | 10 | 5 | 107% |
| '8' | 'E' | e | 80 | 20 | 80 | a | 85 | 10 | 5 | 106% |
| Reference | | | | | | | | | | |
| '9' | 'E' | b | 80 | 20 | 80 | a | 85 | 10 | 5 | 102% |

Notes (1): capac. = capacitance
Temp = temperature in °C.
Cur. = current density in A/dm$^2$
t" = time in seconds
t' = time in minutes
1st = primary
2nd = secondary
Notes (2): Bath components (in %)

| Symbols | a | b | c | d | e | f | g | h |
|---|---|---|---|---|---|---|---|---|
| HCl | 5 | 5 | 5 | 5 | 5 | 5 | 5 | 5 |
| H$_2$SO$_4$ | — | 5 | 10 | 20 | 30 | 40 | 50 | — |
| H$_2$C$_2$O$_4$ | — | — | — | — | — | — | — | 0.1 |

As seen in Table 2, the method employing the conditions prescribed herein was more effective to increase the electrostatic capacitance, than the other case wherein any of the conditions was not included in the prescribed range.

In summary, the aluminum foil provided herein as a raw foil for producing electrolytic condenser electrodes has an aluminum purity of 99.9% or more and contains Mg at 50–500 ppm. Mg contained in the raw foil facilitates uniform formation of etching pits in the surface of the raw foil when it is etched. The etching process, thus proceeding smoothly to increase the effective surface area of each foil to a remarkable extent, produces the electrode foil of a higher electrostatic capacitance and an improved electric property.

The method provided herein to etch the raw foil consists of the primary etching stage and secondary one, wherein the raw foil is etched in a bath of 3–10% HCl and 10–40% H$_2$SO$_4$ solution at 70°–90° C. and with a current of 10–40 A/dm$^2$, at the primary stage. The foil thus primarily etched has etching pits distributed evenly, so that their diameter is enlarged in harmony during secondary electrolytic or chemical etching stage conducted in another bath containing 3–10% by weight of HCl with or without 1% or less of H$_2$C$_2$O$_4$, at 70°–95° C. and with a current of 0–10 A/dm$^2$. The electrode foil thus produced has an increased effective surface affording a higher electrostatic capacitance.

What is claimed is:

1. An aluminum foil for use in preparing electrodes for electrolytic condensers, said foil consisting of aluminum having an initial purity of 99.98% by weight or higher, to which 50–500 ppm of magnesium has been added.

2. An aluminum foil according to claim 1, where in 50–100 ppm of magnesium has been added to the aluminum.

3. An electrode for an electrolytic condenser consisting of an etched aluminum foil consisting of aluminum having an initial purity of 99.98% by weight or higher to which 50–500 ppm of magnesium has been added.

4. An electrode for an electrolytic condenser according to claim 3, wherein 50–100 ppm of magnesium has been added to the aluminum.

* * * * *